United States Patent [19]

Haisma et al.

[11] Patent Number: 4,747,862

[45] Date of Patent: May 31, 1988

[54] METHOD OF MANUFACTURING A DEVICE FOR CONDUCTING QUANTIZED PARTICLES

[75] Inventors: Jan Haisma; Eltjo Scholtens, both of Eindhoven, Netherlands

[73] Assignee: U.S. Philips Corp., New York, N.Y.

[21] Appl. No.: 909,805

[22] Filed: Sep. 22, 1986

[30] Foreign Application Priority Data

Oct. 23, 1985 [NL] Netherlands ..................... 8502889

[51] Int. Cl.⁴ ............................................ C03B 37/027
[52] U.S. Cl. ............................................ 65/4.1; 65/2; 65/3.11
[58] Field of Search ............. 65/2, 3.11, 4.1, 4.2, 65/4.21, 4.23, 3.12

[56] References Cited

U.S. PATENT DOCUMENTS

| | | | |
|---|---|---|---|
| 2,979,632 | 4/1961 | MacNeille | 65/4.21 X |
| 2,992,956 | 7/1961 | Bazinet | 65/4.21 X |
| 3,211,540 | 10/1965 | Cole | 65/4.21 |
| 3,247,756 | 4/1966 | Siegmund | 83/1 |
| 3,679,384 | 7/1972 | Colson et al. | 65/4.21 |

FOREIGN PATENT DOCUMENTS 58-143302 8/1983 Japan ........................... 65/4.3

*Primary Examiner*—Robert L. Lindsay
*Attorney, Agent, or Firm*—Ernestine Bartlett

[57] ABSTRACT

A method is provided of manufacturing a device for conducting quantized particles such as photons and electrons. The method comprises the following steps:

providing a layer of magnetizable material throughout the length of a conductor;

dividing the conductor into conductor pieces having a predetermined length;

aligning the conductor pieces by means of a magnetic field in such a manner that their ends are positioned perpendicularly to an abutment face;

bundling the conductor pieces to a dense packing; and joining the bundled conductor pieces to a mechanical unit.

The method is preferably carried out in such a manner that the abutment face extends substantially perpendicularly to the direction of the gravitational field and that the attraction caused by the magnetic field is greater than and opposed to the force of gravity caused by the gravitational field.

28 Claims, 5 Drawing Sheets

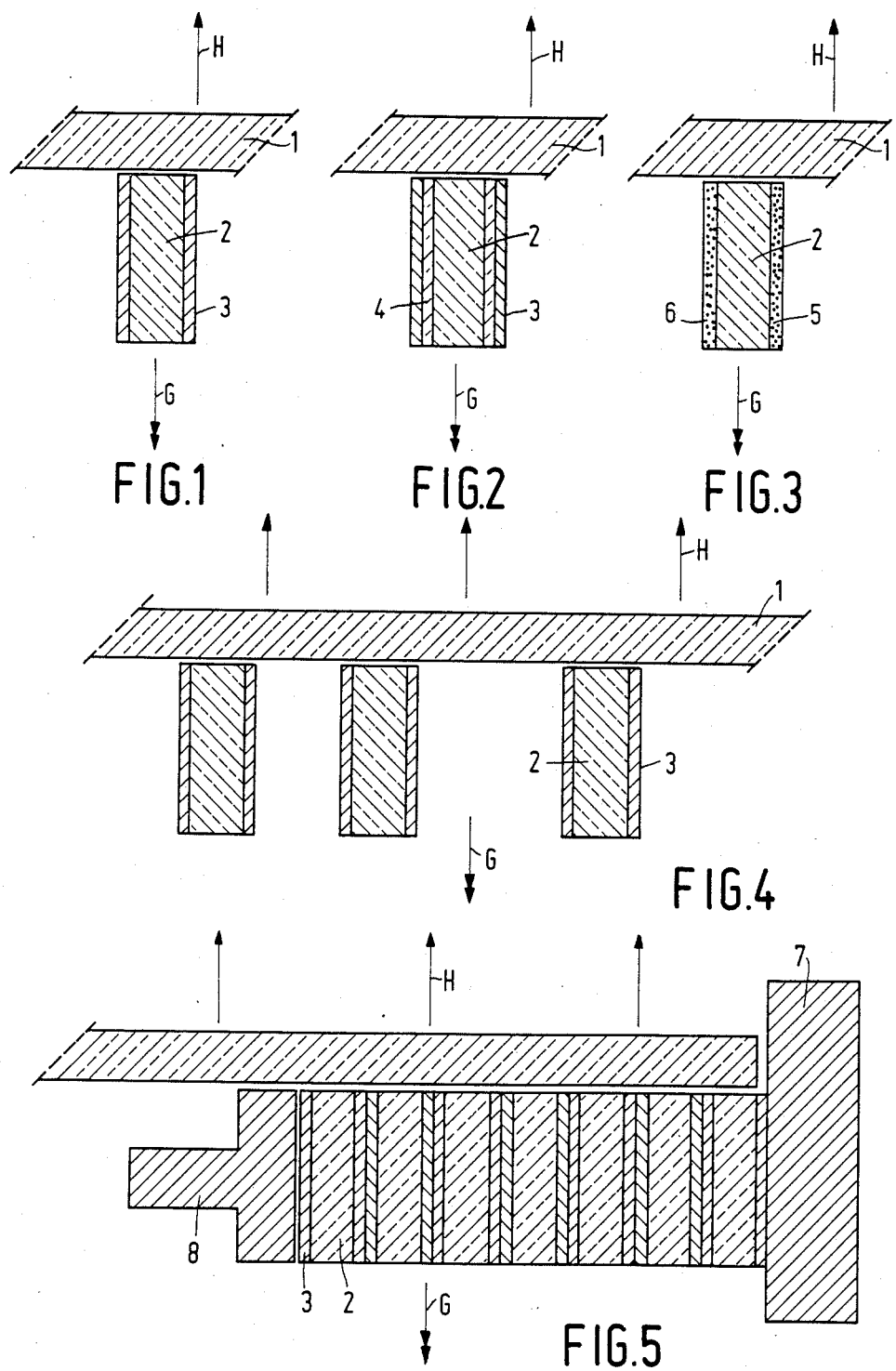

METHOD OF MANUFACTURING A DEVICE FOR CONDUCTING QUANTIZED PARTICLES

BACKGROUND OF THE INVENTION

The invention relates to a method of manufacturing a device for conducting quantized particles in which a plurality of separate elongated conductor pieces which are substantially parallel is bundled. In this connection quantized particles are understood to mean notably photons or electrons.

A method of this type is known from U.S. Pat. No. 3,211,540. This specification describes a method in which a large number of light-conducting fibers of substantially uniform length are positioned upright in a forming means in side-by-side relation to form a bundle. The bundle is heated to a temperature at which the sleeves of the fibres soften and fuse. After cooling, a fibre-optical image transfer device (a "fibre screen") is obtained.

A difficulty in this method is the alignment of the separate fibres, that is to say, applying the fibres to the forming means in such a manner that all of them are at right angles to the bottom of the forming means. When in the known method a fibre takes up a "crosswise" position on filling the forming means, there is no way of getting it in line again.

SUMMARY OF THE INVENTION

It is an object of the invention to provide a method which makes it possible to cut fibre from a reel into pieces of prescribed length in a simple and desired manner and to align the fibre pieces prior to their being fused.

According to the invention the method of the type described in the opening paragraph is characterized in that it comprises the following steps:
  providing a layer of magnetizable material throughout the length of a conductor;
  dividing the conductor into conductor pieces having a predetermined length;
  aligning the conductor pieces by means of a magnetic field in such a manner that their ends are positioned against an abutment face;
  bundling the conductor pieces into dense packing; and
  joining the bundled conductor pieces into a single unit.

The effect of the invention is based on the recognition that natural forces in the longitudinal direction of the fibre pieces are utilized when aligning the fibre pieces provided with an outer layer of magnetizable material. The method according to the invention is preferably carried out in such a manner that the abutment face extends substantially normal to the direction of the gravitational field and that the attraction caused by the magnetic field is greater than and opposed to the force of gravity caused by the gravitational field.

The magnetizable layer around the fibre pieces may also serve as an adhesive layer in the joining process. The layer then consists of, for example, a material having a lower deformation temperature than the core and than a layer which possibly envelops the core and comprises magnetizable particles suspended therein forming a so-called "composite".

An alternative method is to provide the conductors with a sleeve of adhesive material prior to their being bundled into a dense packing.

A material whose adhesive effect is obtained either under the influence of a temperature treatment, or under the influence of UV radiation, may be used to advantage. Preferably it is also a light-absorbing material.

The circumstance in which the fibres are provided with a sleeve within the scope of the invention provides an additional possibility. It is characterized in that the sleeve of the fibre pieces formed by the adhesive and/or the magnetizable layer is rendered thicker at one end of the conductor pieces than at the other end of the conductor pieces. The conductor pieces are aligned in such a manner that the thick ends combined constitute a first end face and the thin ends combined constitute a second end face.

In this manner an image transfer device (a fibre screen) can be obtained in which the first end face has larger dimensions than the second end face. As will be further described, such a fibre screen may be advantageously used in a variety of ways.

The method according to the invention is applicable to the alignment and bundling of solid, light-transmitting fibre pieces for conducting light as well as for aligning and bundling hollow fibre pieces into a so-called channel plate adapted to conduct electrons.

In the former case it is advantageous for the envisaged application when at least one end of the bundle of conductor pieces is connected to a light-transmitting plate.

According to one embodiment of the method according to the invention the light-transmitting plate at one end of the bundle can also be used as an abutment face for alignment.

BRIEF DESCRIPTION OF THE DRAWINGS

Some embodiments of the method according to the invention will be described with reference to the drawings in which, FIG. 1 shows the alignment in a magnetic field of a fibre provided with a magnetic sleeve against an abutment face;

FIGS. 2 and 3 show the same alignment step as in FIG. 1; using different fibres;

FIG. 4 shows the alignment in a magnetic field of a number of fibre pieces provided with a magnetic sleeve;

FIG. 5 shows the compression of a number of aligned fibre pieces against a vertical abutment face;

DESCRIPTION OF THE PREFERRED EMBODIMENTS

Figure 6A:
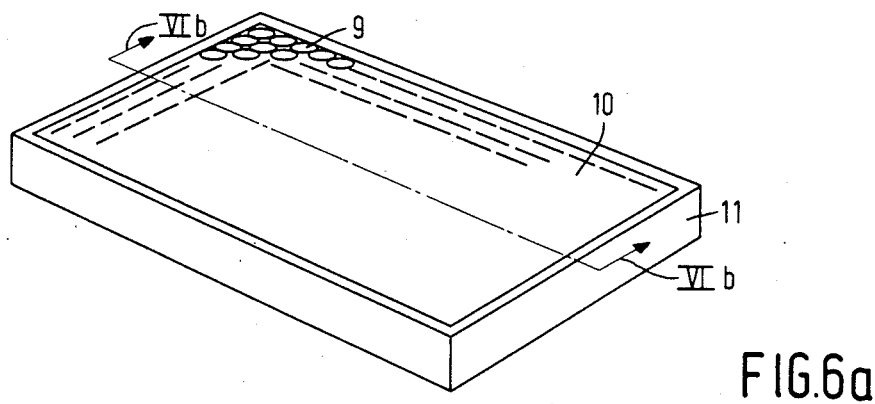
FIG. 6a shows a fibre screen around which a tape has been wound.

Fibre pieces having a core 2 of, for example, glass, and a sleeve 3 of magnetizable material having a refractive index lower than that of the core, are obtained by dividing a long fibre into short pieces having a uniform length (FIG. 1). The magnetizable sleeve 3 may be provided, for example, by means of an electroless method (via chemical processing), or via atomic deposition (vapour deposition, sputtering) or via spinning, immersion or aerosol decomposition. A suitable material for the magnetizable sleeve is, for example, CoP.

Separate fibre pieces are directed in a homogeneous magnetic field H along the magnetic field lines. This effect is utilized in the method according to the invention. In an external magnetic field H, which is transverse to the plane of the glass plate 1, a fibre piece provided with a magnetizable sleeve 3 will hang down perpendicularly due to the force of gravity G.

In FIGS. 2 and 3 the same effect is utilized, but the fibre pieces have a different structure. In FIG. 2 the fibre piece has a core 2 of glass and a sleeve 4 of a material having a lower refractive index (glass or synthetic material). The outer diameter is, for example, 250 $\mu$m. A layer 3 of magnetizable material, for example, a layer of CoP of some microns thickness is provided around this piece. In a magnetic field H such a fibre piece can hang from a glass plate 1 having a thickness up to several mm.

The same applies to fibre pieces of the type shown in FIG. 3. In these pieces a core 2 is surrounded by a layer 5 consisting of a composite having a lower refractive index than that of the core 2. The layer 5 comprises magnetizable particles 6 homogeneously distributed over the sleeve volume.

When alignment of separate fibre pieces is possible, it is then possible to align a multitude of fibre pieces and subsequently connect them together.

FIG. 4 shows a number of fibre pieces having core 2 and magnetizable sleeve 3 aligned in the manner according to the invention. In a subsequent step these fibre pieces are bundled.

FIG. 5 shows one possible way of bundling the assembly of aligned fibre pieces with core 2 and magnetizable sleeve 3. The fiber pieces are pressed against a vertical abutment face 7 with the aid of a pressure means 8 in such a manner that the fibre pieces are hanging in a side-by-side relationship. The magnetic field H may be slightly inhomogeneous such that a driving force is produced which moves the fibre pieces as far as the abutment face 7.

Figure 6B:
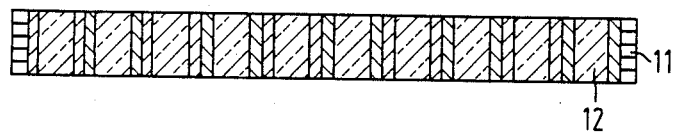
FIG. 6b shows a cross-section through this screen.

FIG. 6a shows an assembly 10 of fibre pieces 9 around which a tape 11 is wound. FIG. 6b is a cross-section through the resultant display screen 12.

Figure 7:
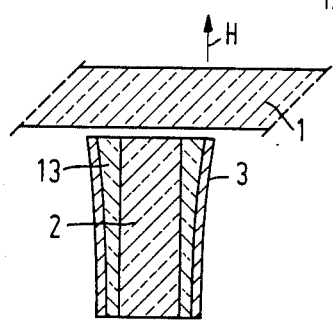
FIG. 7 shows the alignment in a magnetic field of a fibre piece having a sleeve varying in thickness.

FIG. 7 shows a situation analogous to that of FIG. 2, except for an upwardly increasing diameter of the magnetizable fibre sleeve 13 with a refractive index which is lower than that of the core 2.

Figure 8A:
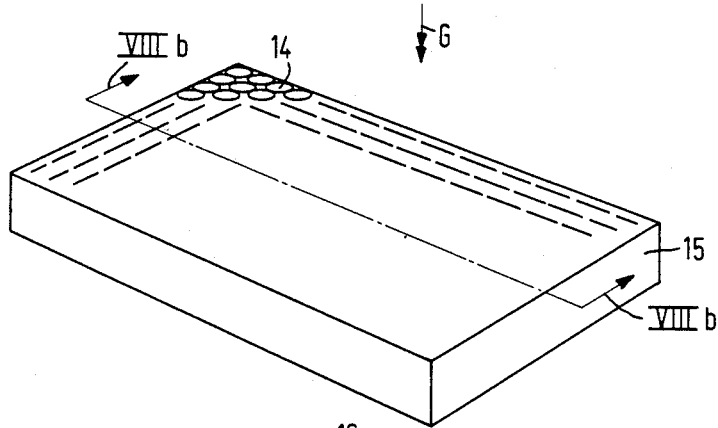
FIG. 8a shows a fibre screen composed of fibre pieces having a sleeve varying in thickness and around which a tape has been wound.
Figure 8B:
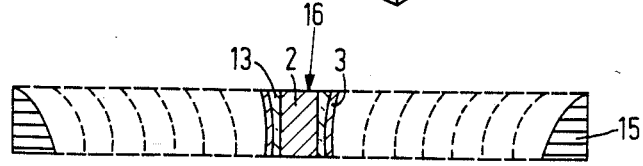
FIG. 8b shows a cross-section through this screen.

FIG. 8a shows a display screen consisting of an assembly of fibre pieces varying in diameter around which a tape 15 is wound. FIG. 8b is a cross-section through the display screen 16.

Figure 9A:
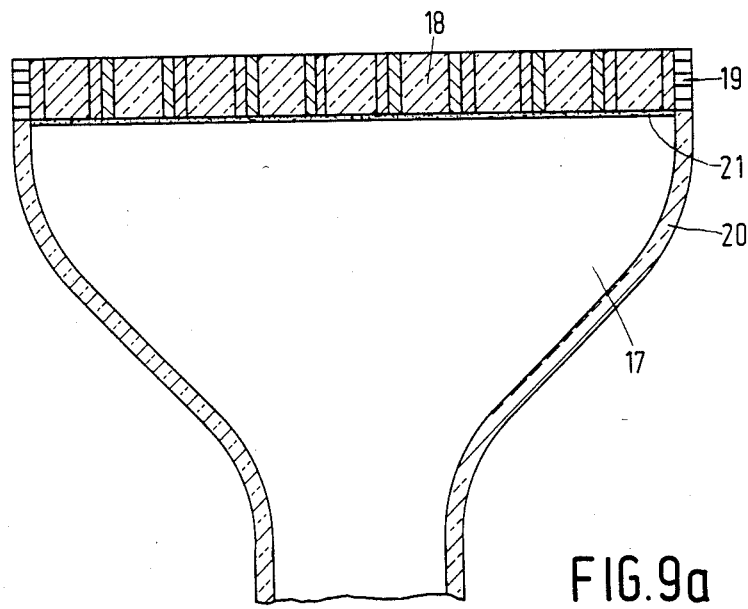
FIG. 9a is a sectional view in the longitudinal direction of a display tube having a fibre screen as a front plate and FIG. 9b shows a display tube with a fibre screen on the inside of the front plate.

FIG. 9a shows a part of a vacuum tube 17 having a fibre screen 18 around which a tape 19 is wound which is intimately connected to a tube wall 20. A fluorescent phosphor coating 21 is provided on the inside of the fibre screen 18. The advantages of such a construction are a flat, window, an image on the front side of the tube and a large viewing angle of uniform intensity.

Present-day television screens comprise an absorbing material having approximately 30% light absorption measured over the thickness of the screen. This absorption is necessary to sufficiently attenuate the light from the omnilaterally radiating phosphor falling outside the angle of total reflection and consequently being entirely reflected so as to prevent disturbing secondary omnilateral scattering by the further adjacent phosphor in the tube.

To avoid this problem the invention provides the following possibility.

Figure 9B:
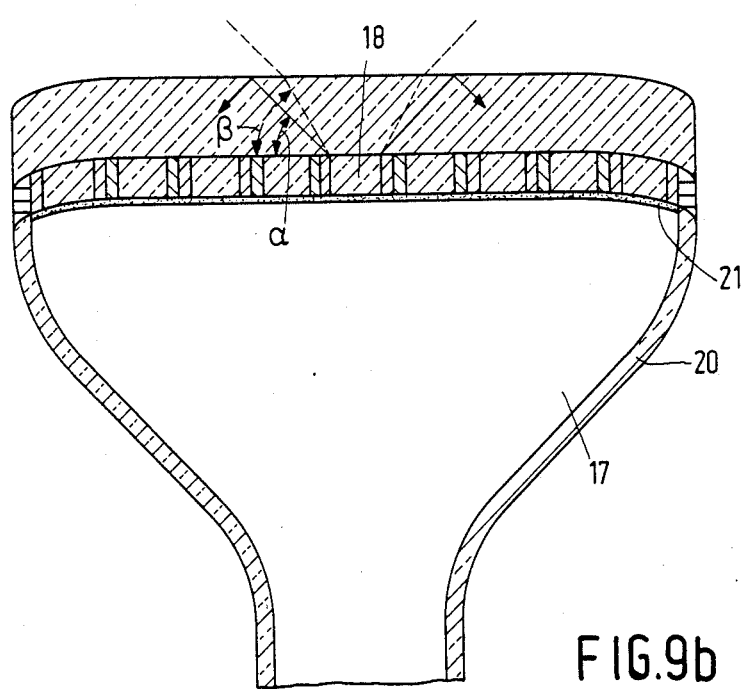

Fibre pieces having a magnetic coating can be provided on the inside of a television screen in a manner according to the invention. This fibre layer then serves to ensure that by correct choice of the refractive index of the fibre core relative to the screen glass the beam of light from the omnilaterally radiating phosphor is such that the exit angle of the light from the fibre falls within the angle of total reflection of the screen glass. See FIG. 9b for a diagrammatic representation.

Figure 10:
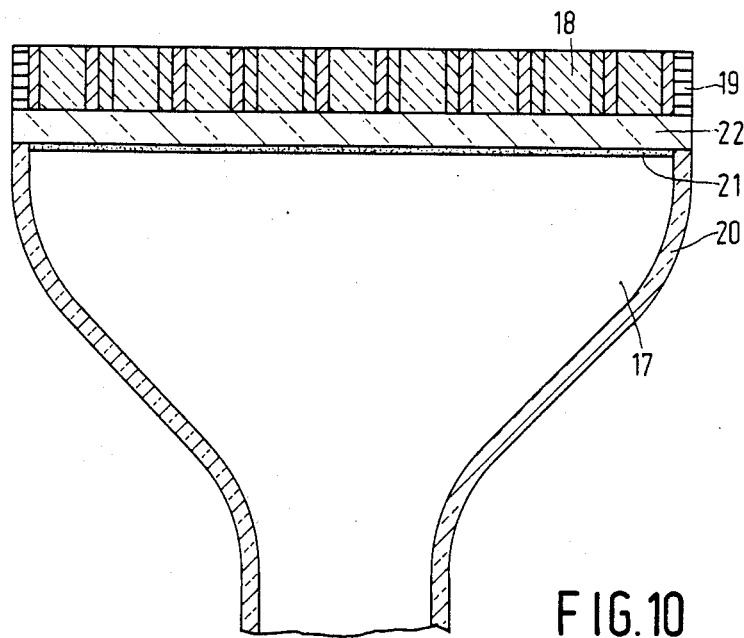
FIG. 10 is a longitudinal section through a display tube having a fibre screen intimately connected to a glass plate with a fluorescent phosphor on its vacuum side.

FIG. 10 shows a part of a vacuum tube 17 having a fibre screen 18 around which a tape 19 has been wound. The fibre screen 18 with the tape 19 is intimately connected to a glass plate 22 which is provided with a fluorescent phosphor layer 21 on the inside of the tube. The glass plate 22 with the fibre screen 18 and phosphor layer 21 is connected vacuum-tight to a tube wall 20.

Figure 11:
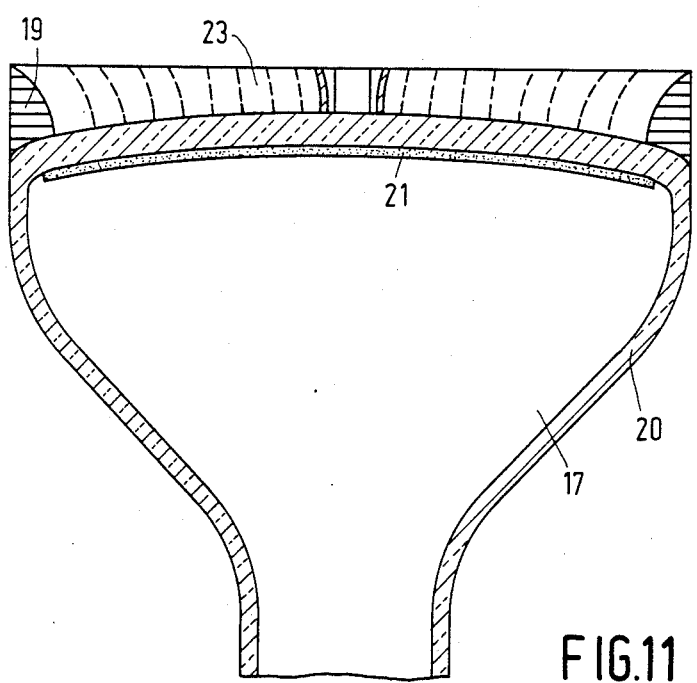
FIG. 11 is a longitudinal section through a display tube having a fibre screen varying in thickness on tope of the display tube glass so that the upper side can be flattened, the sleeve of the fibre pieces varying in diameter in such a manner that the upper side of the screen exactly fills the tube face plate.

FIG. 11 shows a part of a vacuum tube 17 in a cross-section with the outside of the front plate having a fibre screen 23 whose fibres are tapered and around which a tape 19 has been wound. The assembly is intimately connected to the tube wall 20. The fibre surface entirely fills the tube face plate on the upper side. A fluorescent phosphor layer 21 is provided on the inside of the display tube 17. The dimensions on the image side are thus larger than the dimensions on the phosphor side.

Figure 12:
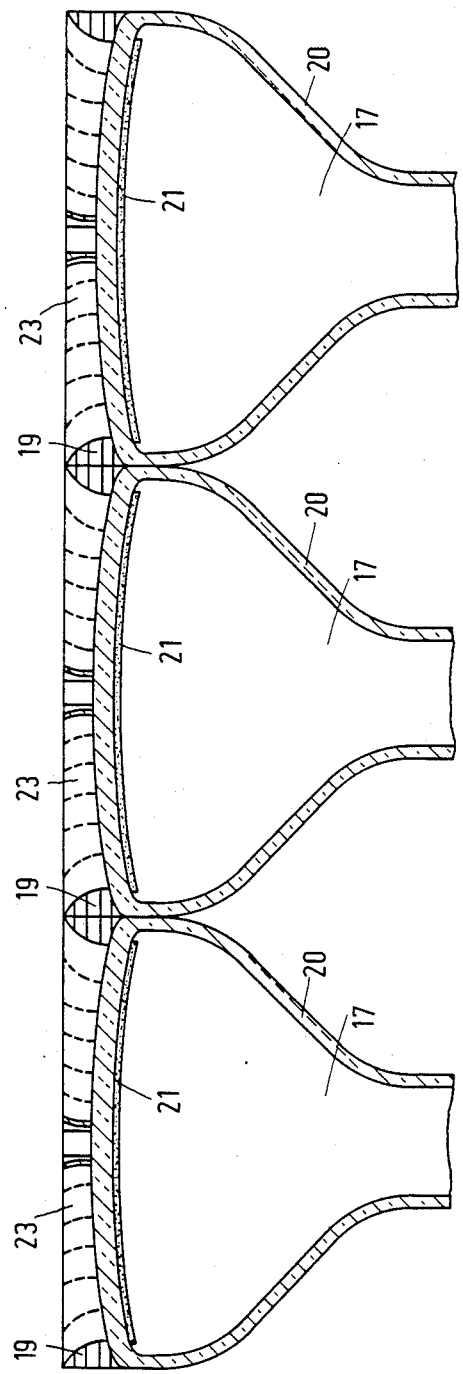
FIG. 12 is a longitudinal section through an assembly of display tubes of the type of FIG. 11 as a component of a vidi-wall display device.

FIG. 12 shows an assembly of three display tubes of the type of FIG. 11 in such a manner that a "vidi-wall" can be built up with a continuous image consisting of contiguous partial images.

It is to be noted that clarity has been aimed at in all the drawings, but that the drawing is not to scale. In most cases the sealing layer for bonding the fibre pieces is not shown for the sake of simplicity.

What is claimed is:

1. A method of manufacturing a device for conducting quantized particles in which a plurality of separate elongated conductor pieces which are substantially parallel is bundled, characterized in that the method comprises the following steps:
   providing a layer of magnetizable material throughout the length of a conductor;
   dividing the conductor into conductor pieces having a predetermined length;
   aligning the conductor pieces by means of a magnetic field and a gravitational field in such a manner that their ends are positioned against an abutment face that extends substantially normal to the direction of the gravitational field, the attraction caused by the magnetic field being greater than and opposed to the force of gravity caused by the gravitational field;

bundling the conductor pieces into dense packing; and joining the bundled conductor pieces into a single unit.

2. A method of manufacturing a bundle of substantially parallel elongated flexible fibers, said method comprising the steps of:

providing a plurality of fiber segments, each fiber segment having sides, first and second end faces and a predetermined length;

providing a layer of magnetizable material throughout the length of each fiber;

aligning the fiber segments in a magnetic field and in a gravitational field, the first end faces of the fiber segments being positioned against an abutment face, the sides of the fibers not being positioned against anything except, at most, other fibers, the abutment face extending substantially perpendicular to the direction of the gravitational field, the gravitational field attracting the fiber segments in a first direction, the magnetic field attracting the fiber segments in a second direction opposite the first direction, the attraction by the magnetic field being greater than the gravitational attraction, the first ends of the fibers being at a higher potential energy in the gravitational field than the second ends of the fibers;

packing the aligned fiber segments into a dense bundle while maintaining them in alignment; and joining the sides of the fiber segments to each other to form a single unit.

3. A method as claimed in claim 1, characterized in that the conductors are provided with a sleeve of adhesive material prior to their being bundled into a dense packing.

4. A method as claimed in claim 3, characterized in that a light-absorbing material is used as the adhesive material.

5. A method as claimed in claim 3, characterized in that an adhesive material is used whose adhesive effect is obtained under the influence of a temperature treatment.

6. A method as claimed in claim 3, characterized in that an adhesive material is used whose adhesive effect is obtained under the influence of ultraviolet radiation.

7. A method as claimed in claim 3, characterized in that the magnetizable layer also serves as an adhesive layer.

8. A method as claimed in claim 3, characterized in that the sleeve of the conductor pieces formed by the adhesive and/or magnetizable layer is rendered thicker at one end of the conductor pieces than at the other end of the conductor pieces and that they are aligned in such a manner that the thick ends combined constitute a first end face and the thin ends combined constitute a second end face.

9. A method as claimed in claim 3, characterized in that the conductor pieces are solid and light-transmitting.

10. A method as claimed in claim 9, characterized in that at least one end of the bundle of conductor pieces is connected to a light-transmitting plate.

11. A method as claimed in claim 10, characterized in that the light-transmitting plate is used as an abutment face for alignment.

12. A method as claimed in claim 11, characterized in that the light-transmitting plate is the front plate of a television display device.

13. A method as claimed in claim 8, characterized in that an assembly of devices contiguous to the first end face is formed so that an image transferred by said assembly is built up from contiguous partial images transferred by each device.

14. A method as claim in claim 1, characterized in that the conductor pieces are hollow and are adapted to conduct electrons.

15. A method of manufacturing a bundle of substantially parallel elongated optical conductors, said method comprising the steps of:

providing an optical conductor having a length;

providing a layer of magnetizable material throughout the length of the conductor;

dividing the conductor into conductor segments, each conductor segment having sides, an end face and a predetermined length;

aligning the conductor segments in a magnetic field and in a gravitational field, the end faces of the conductor segments being positioned against an abutment face which extends substantially normal to the direction of the gravitational field, the attraction caused by the magnetic field being greater than and opposed to the force of gravity caused by the gravitational field, the sides of the conductors not being positioned against anything except, at most, other conductors;

packing the conductor segments into a dense bundle while maintaining them in alignment; and joining the sides of the conductor segments to each other to form a single unit.

16. A method as claimed in claim 15, characterized in that the abutment face extends substantially perpendicular to the direction of the gravitational field, the gravitational field attracts the conductor segments in a first direction, and the magnetic field attracts the conductor segments in a second direction opposite the first direction.

17. A method as claimed in claim 16, further comprising the step of coating the conductor with an adhesive material prior to packing the conductor segments into a bundle.

18. A method as claimed in claim 17, characterized in that the adhesive material is a light-absorbing material.

19. A method as claimed in claim 17, characterized in that the adhesive material is heat-activated.

20. A method as claimed in claim 17, characterized in that the adhesive material is activated by exposure to ultraviolet radiation.

21. A method as claimed in claim 17, characterized in that the adhesive material is magnetizable.

22. A method as claimed in claim 17, characterized in that:

each conductor segment has first and second opposite ends having thicknesses;

each first end is thicker than each second end; and the conductor segments are aligned with their first ends forming a first end face, and with their second ends forming a second end face.

23. A method as claimed in claim 17, characterized in that:

the bundle of conductor segments has first and second opposite end faces; and the method further comprises the step of connecting a light-transmitting plate to one end face of the bundle.

24. A method as claimed in claim 23, characterized in that during the step of aligning the conductor segments, the light-transmitting plate forms the abutment face.

25. A method as claimed in claim 24, characterized in that the light-transmitting plate is a front plate of a television display device.

26. A method as claimed in claim 22 further comprising the step of arranging two or more bundles of conductor segments against each other such that their first end faces are substantially contiguous, and such that their second end faces are substantially contiguous.

27. A method of manufacturing a bundle of substantially parallel elongated fibers, said method comprising the steps of:

providing a plurality of fiber segments, each fiber segment having sides, an end face and a predetermined length;

providing a layer of magnetizable material throughout the length of each fiber;

aligning the fiber segments in a magnetic field, the end faces of the fiber segments being positioned against an abutment face, the sides of the conductors not being positioned against anything except, at most, other conductors;

packing the aligned fiber segments into a dense bundle while maintaining them in alignment in said magnetic field; and joining the sides of the fiber segments to each other to form a single unit.

28. A method and claimed in claim 27, characterized in that:

the positive susceptibility material is a magnetizable material; and the force field is a magnetic field.

* * * * *